United States Patent
Derks

[19]

[11] Patent Number: 5,848,147
[45] Date of Patent: Dec. 8, 1998

[54] TERMINAL FOR WIREBOUND TELECOMMUNICATION

[75] Inventor: Henk Derks, Eindhoven, Netherlands

[73] Assignee: U.S. Philips Corporation, New York, N.Y.

[21] Appl. No.: 753,555

[22] Filed: Nov. 26, 1996

[30] Foreign Application Priority Data

Nov. 29, 1996 [EP] European Pat. Off. ............. 95203286

[51] Int. Cl.⁶ .................................................. H04M 1/00
[52] U.S. Cl. ......................... 379/390; 399/387; 399/388; 399/377
[58] Field of Search .................................... 379/377, 387, 379/382, 418, 413, 275, 375, 164, 424, 388, 389, 390

[56] References Cited

U.S. PATENT DOCUMENTS

| | | | |
|---|---|---|---|
| 4,233,474 | 11/1980 | Hishinuma et al. | 379/395 |
| 4,748,664 | 5/1988 | Blomley | 379/395 |
| 4,856,055 | 8/1989 | Schwartz | 379/374 |
| 5,118,997 | 6/1992 | El-Hanansy | 315/248 |
| 5,155,764 | 10/1992 | Malaurie et al. | 379/377 |
| 5,410,592 | 4/1995 | Wagener et al. | 379/388 |
| 5,672,998 | 9/1997 | Wittlinger | 330/10 |

FOREIGN PATENT DOCUMENTS

| | | | |
|---|---|---|---|
| 4123763A1 | 1/1993 | Germany | H04M 19/04 |
| 2163320 | 2/1986 | United Kingdom . | |

OTHER PUBLICATIONS

Wirebound telecom applications handbook 1995, Philips Semiconductors, pp. 125–145.

"Designing a Versatile Telephone Set—part IV", New Electronics, Nov. 6, 1995, David O'Neill Mullard.

Primary Examiner—Daniels S. Hunter
Assistant Examiner—Charles N. Appiah

[57] ABSTRACT

A terminal (1) for wirebound telecommunication according to the invention comprises a class D amplifier which is supplied with a rectified ringing voltage ($V_{ring}$) coming from the line (2) in a ringing condition and, in an off-hook condition, is supplied with the line voltage ($V_{In}$) coming from the line (2). A class D amplifier (20) is advantageous in that it is suitable for use with supply voltages which may vary over a large range. As a result, both the rectified ringing voltage ($V_{ring}$) and the line voltage ($V_{In}$) can plainly be used as a supply voltage for the amplifier (20) and no additional circuits are necessary for matching these voltages.

4 Claims, 3 Drawing Sheets

TERMINAL FOR WIREBOUND TELECOMMUNICATION

BACKGROUND OF THE INVENTION

1. Field of the Invention

The invention relates to a terminal for wirebound telecommunication, comprising an amplifier to be fed by a telecommunication line to which the terminal can be connected, the terminal being arranged for using, in a ringing condition, a ringing voltage coming from the telecommunication line to feed the amplifier and, in an off-hook condition, for using a line voltage coming from the telecommunication line to feed the amplifier.

2. Description of the Related Art

A telecommunication terminal as defined in the opening paragraph is described in "Wirebound Telecom Applications Handbook 1995" by Philips Semiconductors, pp. 125–145. In this publication is described a so-termed listen-in telephone set. Such a telephone set comprises a loudspeaker on the outside of the set, meant for reproducing the user signal, in this case speech, in such a way that this is also audible at some distance from the telephone set. The telephone set described here also uses this loudspeaker to reproduce the ringing melody. The telephone set comprises an amplifier for amplifying both the ringing melody and the speech signal. If there is a ringing voltage on the line which represents the ringing condition, a ringing melody is applied to the amplifier. In the ringing condition the ringing voltage is used for feeding the amplifier. The ringing voltage, an AC voltage having a peak value of about 80 volts and a frequency of 25 Hz, is first rectified for this purpose and then converted by a switched-mode power supply to a lower supply voltage suitable for the power supply to the amplifier. In an off-hook condition, the speech signal is applied to the amplifier. In this mode the amplifier is directly supplied with a line voltage which has a value of about 5 volts suitable for this purpose. A disadvantage of the telephone set described here is that it needs additional circuits, such as the switched-mode power supply to provide that the amplifier is properly supplied with power both in the ringing condition and in the off-hook condition, which renders this telephone set complicated.

SUMMARY OF THE INVENTION

It is an object of the invention to provide a terminal as defined in the opening paragraph, which is simpler than the known terminal.

For this purpose, a terminal as defined in the opening paragraph is characterized in that the amplifier is a class D amplifier. A class D amplifier is advantageous in that it is suitable for use with supply voltages which may vary over a large range. As a result, both the rectified ringing voltage and the line voltage can be used plainly as a supply voltage for the amplifier and, apart from a rectifier for rectifying the ringing voltage, no circuits are further necessary to influence the value of the supply voltage in the ringing condition or in the off-hook condition. An additional advantage of the use of a class D amplifier is its very high efficiency.

The use of a class D amplifier for amplifying a ringing melody is known per se from the article "Designing a Versatile Telephone Set—Part IV", pp. 59–61, New Electronics, 26 Nov. 1985. This article, however, does not give any indication about using the ringing voltage and the line voltage alternately for the power supply of the class D amplifier as is done in the terminal according to the invention.

An embodiment of a terminal according to the invention is characterized in that a feedback is realized between an output and an input of the class D amplifier. This feedback provides that the volume of the output signal is independent of the variations in the supply voltage.

Another embodiment of a terminal according to the invention is characterized in that the terminal comprises a generator for generating DTMF tones for forming a ringing melody to be amplified by the class D amplifier. Nearly every terminal utilizes DTMF tones for transferring dial code selections to the telephone exchange. It is efficient to use these tones also for forming the ringing melody.

These and other aspects of the invention will be apparent from and elucidated with reference to the embodiments described hereinafter.

DESCRIPTION OF THE PREFERRED EMBODIMENTS

Figure 1:
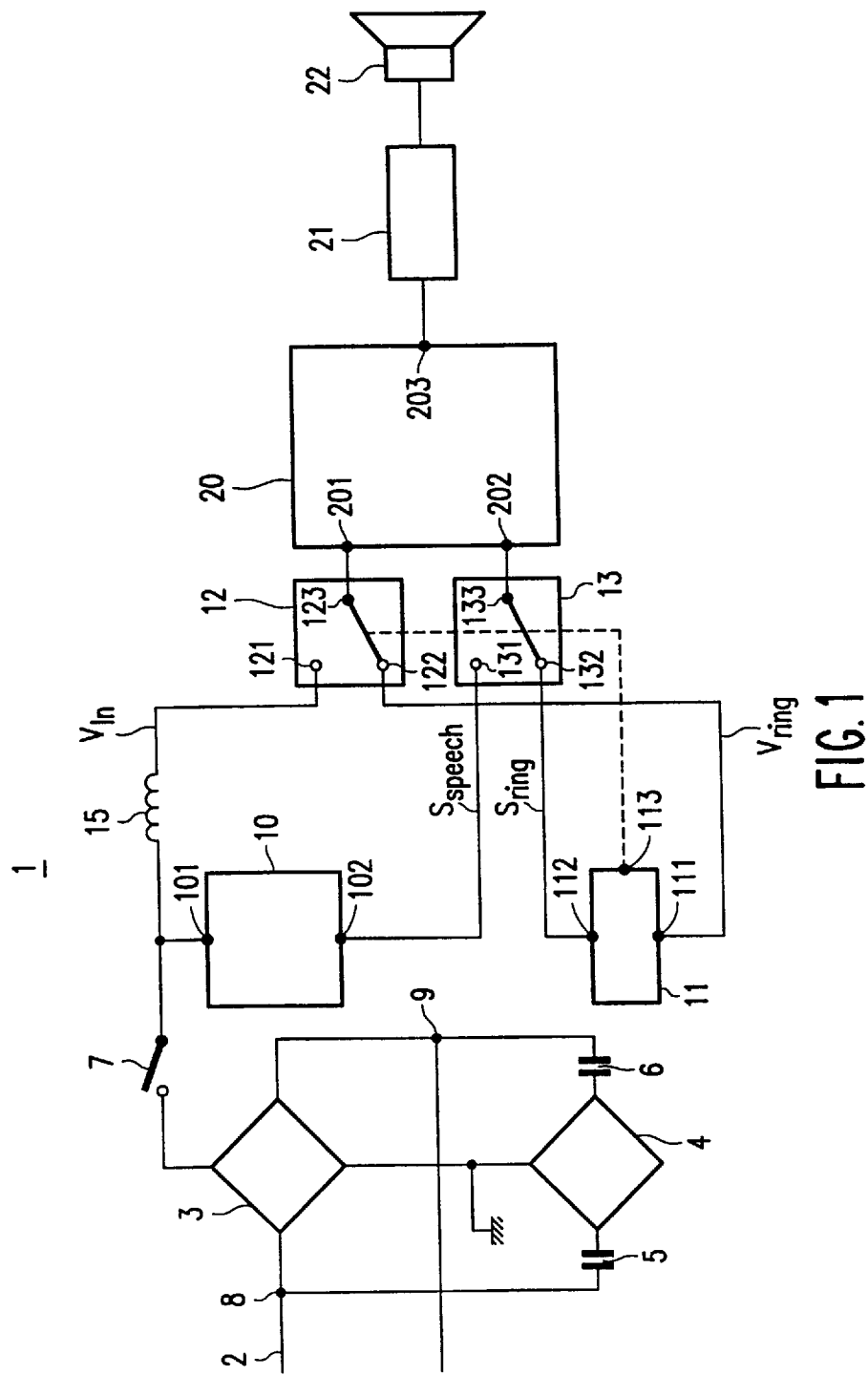
FIG. 1 gives a diagrammatic representation for wirebound telecommunication according to the invention.

FIG. 1 shows in a diagram a terminal 1 for wirebound telecommunication according to the invention. Only the elements that are important to the invention are clearly shown. A terminal according to the invention is, for example, a handsfree telephone or a base station for cordless telephony but may, in principle, be any type of terminal for wirebound telephony. A hands-free telephone comprises not only the microphone and the loudspeaker of the receiver, but also an additional microphone and loudspeaker. Via this additional microphone and loudspeaker a user can telephone without the need to hold the receiver. As a result, he has a large extent of freedom of movement during the call. The loudspeaker, apart from being used for the reproduction of speech, is also used for the reproduction of a ringing melody. A base station for cordless telephony comprises a transmission section for receiving speech signals and signalling by the telephone line from the telephone exchange and transmitting same to the telephone exchange. The base station further comprises a high-frequency part (RF part) and a aerial for transmitting speech signals to a dedicated handset and receiving speech signals from the handset. Such a base station is often equipped with a microphone and a loudspeaker to enable the user to hold a telephone call via the base station in lieu of the handset. This loudspeaker can also be used for the reproduction of a ringing melody.

The telephone set 1 has a first input 8 and a second input 9 for connecting the telephone to a telephone line 2. The telephone set comprises a polarity bridge 3 and a rectifier bridge 4. The rectifier bridge 4 is coupled to the inputs 8, 9 by a first capacitor 5 and a second capacitor 6. The polarity bridge 3 is coupled to an input 101 of a transmission part 10 by a hook switch 7. Likewise, this polarity bridge 3 is coupled to a first input 121 of a first switch 12 by the hook switch 7 and a coil 15. The rectifier bridge 4 is coupled to an input 111 of a microprocessor 11 and also to a second input 122 of the first switch 12. An output 102 of the transmission part 10 is coupled to a first input 131 of a second switch 13. An output 112 of the microprocessor 11 is coupled to a second input 132 of the second switch 13. A further output 113 of the microprocessor is coupled to the first and second switches to control the switches. An output 123 of the first switch 12 is coupled to a power supply input 201 of a class D amplifier 20. An output 133 of the second switch 13 is coupled to a signal input 202 of the class D amplifier 20. An output 203 of the class D amplifier 20 is coupled to a loudspeaker 22 via a low-pass filter 21. The first and second switches 12, 13 are preferably formed by semiconductor elements.

The operation of the apparatus shown in FIG. 1 is as follows. In the off-hook condition the hook switch 7 is closed. The microprocessor 11 produces a control signal through output 113, so that the switches 12, 13 are set to the state which is not shown. This means that the line voltage $V_{In}$, which has a value of about 5 volts, is supplied to the power supply input 201 of the class D amplifier 20. In the off-hook condition, speech signals are received by the telephone line. These speech signals $S_{speech}$ are applied to the signal input of the class D amplifier 20 via the output 102 of the transmission part 10 and the second switch 13. In the ringing condition, the hook switch 7 is opened and so there is no line voltage $V_{In}$ present. The microprocessor 11 notices via its input 111 that a ringing voltage $V_{ring}$ is applied to the telephone set over the telephone line 2 via the second rectifier bridge 4. In response thereto, the microprocessor applies a control signal to the switches 12, 13 via output 113 and causes these switches to be brought to the state shown in the drawing FIG. 1 As a result, the rectified ringing voltage is applied to the power supply input 201 of the class D amplifier 20. Simultaneously, the microprocessor generates a ringing melody $S_{ring}$ formed by DTMF tones, which is applied to the signal input 202 of the class D amplifier 20 via the second switch 13. The combination of DTMF tones which form the ringing melody is stored in a memory associated to the microprocessor.

Figure 2:
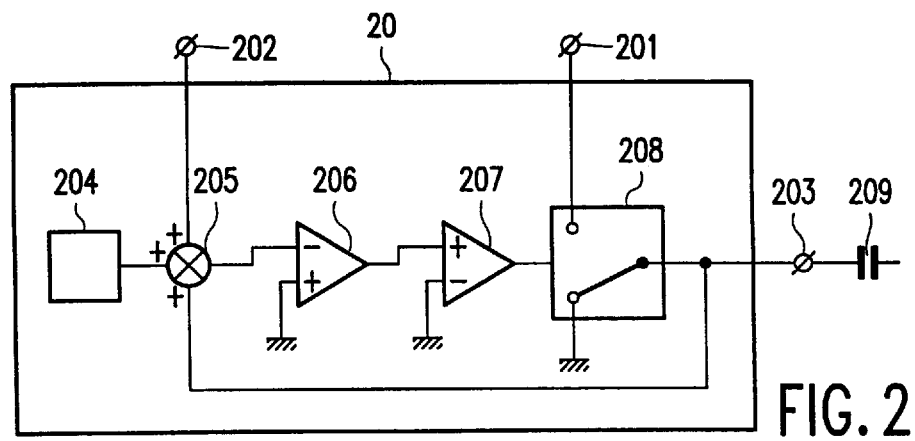
FIG. 2 shows a class D amplifier as used in the terminal according to the invention.

The class D amplifier 20 is shown in more detail in FIG. 2. The class D amplifier comprises a clock 204 whose output is coupled to a signal adder 205. This signal adder adds together the clock signal, the signal coming from the signal input 202 and the signal coming from the output 203. The signal adder 205 is coupled to a negative input of an integrator 206 whose positive input is coupled to a reference voltage. The integrator is coupled to a positive input of a comparator 207. The negative input of the comparator is coupled to a reference voltage. The comparator 207 is coupled to a control input of a switch 208. The switch connects the power supply input 201 to the output 203 in the case of a positive control signal. In the case of a negative control signal the switch connects the reference voltage to the output 203. Furthermore, a coupling capacitor 209 is inserted between the output 203 and the low-pass filter 21. The operation of the class D amplifier shown here is based on pulse width modulation of the output signal. This means that the duty cycle of the output signal varies in dependence on the input signal present on the signal input. The amplitude of the output signal is equal to the supply voltage present on the power supply input 201. After being filtered by the low-pass filter, the amplified input signal is regained. In addition to class D amplifiers working on the basis of pulse width modulation, there are also class D amplifiers which use other types of pulse modulation, such as pulse density modulation. In such a class D amplifier, the number of pulses per time unit are varied on the output in dependence on the size of the input signal. Needless to observe that such a class D amplifier can also be used in a terminal according to the invention.

Figure 3A:
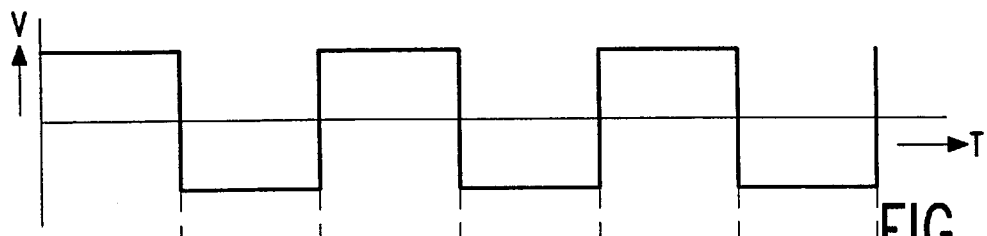
FIGS. 3A to 3D show the signals at a number of positions in the class D amplifier plotted against time, in the absence of an input signal.
Figure 3B:
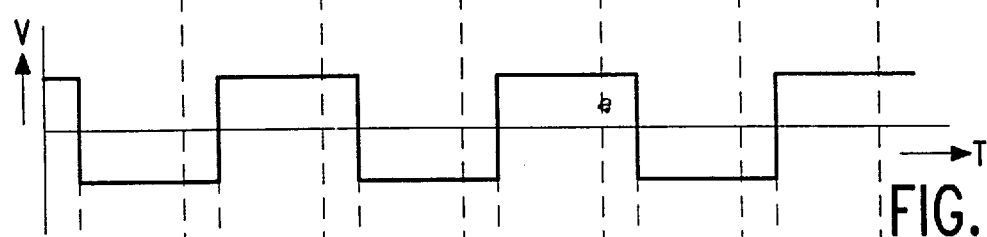
Figure 3C:
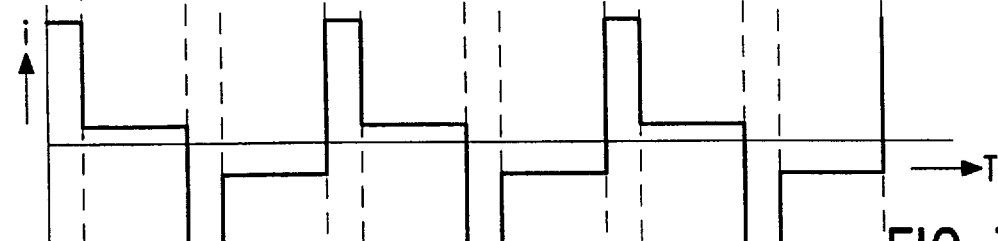
Figure 3D:
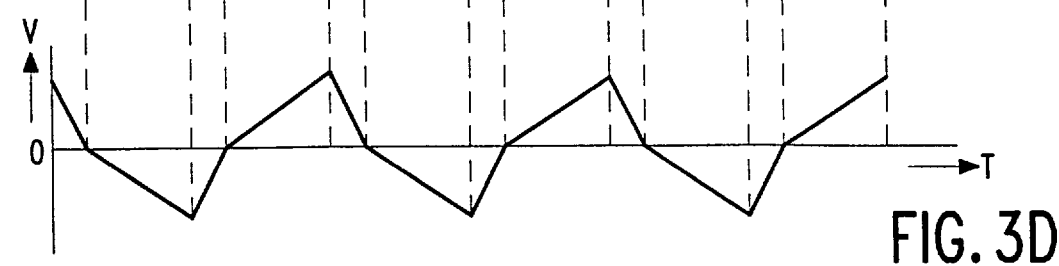

FIGS. 3A to 3D show the curves of the voltage/current at a number of positions in the class D amplifier shown in FIG. 2 in the absence of a signal on the signal input 202. FIG. 3A shows the voltage curve of the clock signal which preferably has a frequency of about 100 kHz and a 50% duty cycle. FIG. 3B shows the voltage curve on output 203. FIG. 3C shows the current curve on the input of the integrator 206. FIG. 3D shows the voltage curve of the signal on the input of the comparator 207. It can be noticed that the duty cycle of the output voltage is 50% in the absence of an input signal. This means that in the absence of an input signal, after filtering by the low-pass filter, no signal is applied to the loudspeaker 22.

Figure 4A:
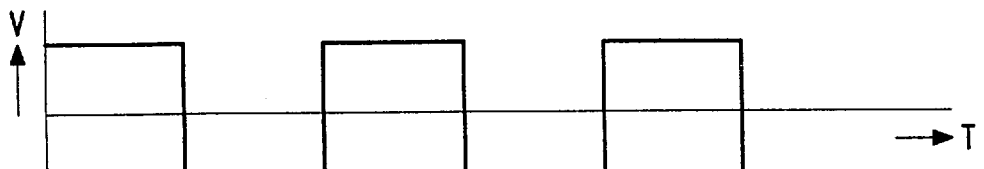
FIGS. 4A to 4E show the signals at a number of positions in the class D amplifier plotted against time, in the presence of an input signal.
Figure 4B:
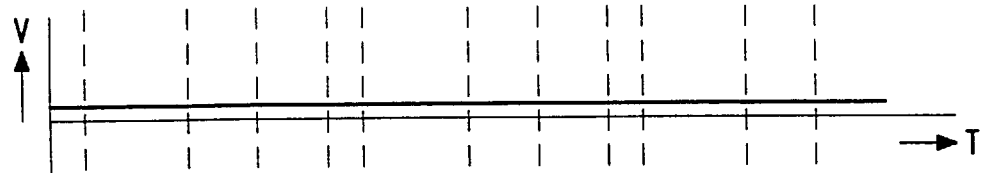
Figure 4C:
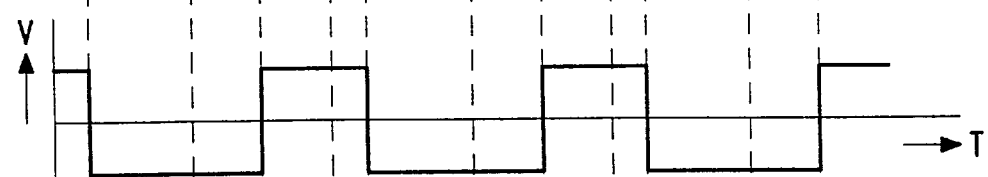
Figure 4D:
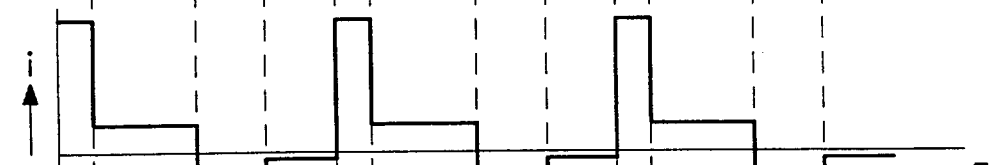
Figure 4E:
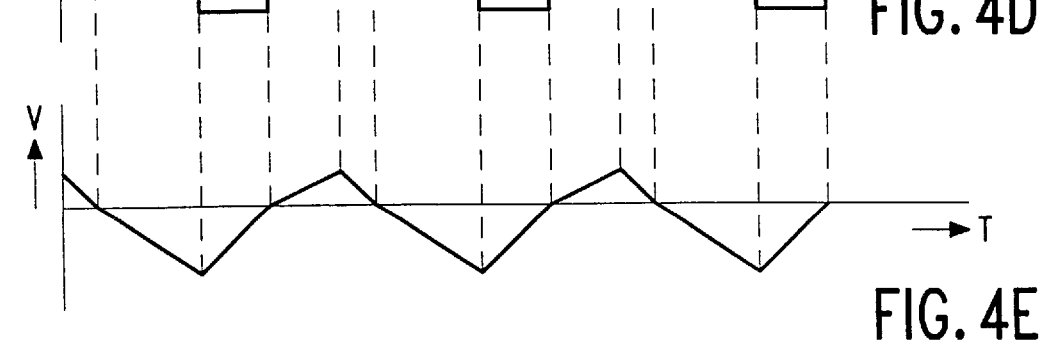

FIGS. 4A to 4E show the curves of the voltage/current at a number of positions in the class D amplifier in the presence of a signal on the signal input 202. FIG. 4A shows the voltage curve of the clock signal, FIG. 4B shows the input signal on the signal input 202, FIG. 4C shows the voltage curve of the output signal, FIG. 4D shows the current curve on the input of the integrator 206, FIG. 4E shows the voltage curve on the input of the comparator 207. It is noticeable that the presence of an input signal on the signal input provides that the duty cycle of the output signal becomes unequal to 50%. As a result, a signal which is an amplified version of the input signal is applied to the amplifier after being filtered by the low-pass filter 21.

The class D amplifier automatically adapts itself to the available supply voltage. In addition, the class D amplifier has a high efficiency. The feedback between the output 203 and the signal adder 205 results in that variations in the supply voltage do not affect the volume of the signal supplied to the loudspeaker.

I claim:

1. Terminal for wirebound telecommunication, comprising; a class D amplifier to be powered by a voltage on a telecommunication line to which the terminal is connectable and on which a ringing condition is indicated by an AC ringing voltage and on which a DC line voltage is applied during an off hook condition; rectifier means for rectifying the AC ringing voltage; and switching means having a first input to which the rectified AC ringing voltage is coupled when the ringing condition occurs, having a second input to which the DC line voltage is coupled when the off hook condition occurs, and having an output coupled to a power supply input of the class D amplifier;

the switching means switching its first input to the power supply input of the class D amplifier when the ringing condition occurs, and switching its second input to the power supply input of the class D amplifier when the off hook condition occurs.

2. Terminal (1) as claimed in claim 1, characterized in that a feedback is realized between an output (202) and an input (203) of the class D amplifier (20).

3. Terminal (1) as claimed in claim 1, characterized in that the terminal (1) comprises a generator (11) for generating DTMF tones for forming a ringing melody ($S_{ring}$) to be amplified by the class D amplifier (20).

4. (NEW) Terminal as claimed in claim 2, characterized in that the terminal comprises a generator for generating DTMF tones for forming a ringing melody to be amplified by the class D amplifier.

* * * * *